United States Patent
Wirth et al.

(10) Patent No.: US 10,510,482 B2
(45) Date of Patent: Dec. 17, 2019

(54) PRIMARY SIDED-ARRANGEMENT OF PRIMARY WINDING STRUCTURES, A METHOD OF MANUFACTURING THE PRIMARY-SIDED ARRANGEMENT, A SYSTEM FOR INDUCTIVE POWER TRANSFER AND A METHOD FOR INDUCTIVELY SUPPLYING POWER TO A VEHICLE

(71) Applicant: Bombardier Primove GmbH, Berlin (DE)

(72) Inventors: Christian Wirth, Winterthur (CH); Robert Czainski, Doluje (PL); Rudolf Lindt, Mannheim (DE)

(73) Assignee: Bombardier Primove GmbH, Berlin (DE)

( * ) Notice: Subject to any disclaimer, the term of this patent is extended or adjusted under 35 U.S.C. 154(b) by 67 days.

(21) Appl. No.: 15/739,430

(22) PCT Filed: Jun. 23, 2016

(86) PCT No.: PCT/EP2016/064557
§ 371 (c)(1),
(2) Date: Dec. 22, 2017

(87) PCT Pub. No.: WO2016/207291
PCT Pub. Date: Dec. 29, 2016

(65) Prior Publication Data
US 2018/0190426 A1    Jul. 5, 2018

(30) Foreign Application Priority Data

Jun. 26, 2015 (GB) .................................. 1511259.2
Jul. 14, 2015 (GB) .................................. 1512275.7
Apr. 22, 2016 (GB) .................................. 1607032.8

(51) Int. Cl.
*H01F 38/14*      (2006.01)
*H02J 50/10*     (2016.01)
(Continued)

(52) U.S. Cl.
CPC .............. *H01F 38/14* (2013.01); *B60L 53/12* (2019.02); *B60L 53/30* (2019.02); *H01F 3/10* (2013.01);
(Continued)

(58) Field of Classification Search
CPC . H01F 38/14; H01F 3/10; H01F 27/28; H01F 41/04; H02J 50/10; B60L 53/12;
(Continued)

(56) References Cited

U.S. PATENT DOCUMENTS 8,590,682 B2    11/2013  Meins et al.
9,067,496 B2     6/2015  Czainski et al.
(Continued)

FOREIGN PATENT DOCUMENTS

GB    2485616 A    5/2012
GB    2505516 A    3/2014
(Continued)

*Primary Examiner* — Hal Kaplan
(74) *Attorney, Agent, or Firm* — The Webb Law Firm

(57) ABSTRACT

The invention relates to a primary-sided arrangement (1) of primary winding structures (W1, W2, W3) of a system for inductive power transfer, wherein the primary-sided arrangement (1) comprises at least three phase lines and at least one winding structure (W1, W2, W3) per phase line, wherein each winding structure (W1, W2, W3) comprises at least one subwinding structure (SW1_1, . . . , SW3_3), wherein the winding structures (W1, W2, W3) extend along a longitudinal axis (x) of the primary-sided arrangement (1), wherein a pitch (P12_1, . . . , P32_3) between corresponding subwinding structures (SW1_1, . . . , SW3_3) of the winding structures (W1, W2, W3) varies along the longitudinal axis (Continued)

(x) and/or a length (L_SW1_1, ..., LSW1_3) of the subwinding structures (SW1_1, ..., SW3_3) of the winding structures (W1, W2, W3) varies along the longitudinal axis (x). The invention further relates to a system for inductive power transfer, to a method of manufacturing a primary-sided arrangement (1) and to a method for inductively supplying power to a vehicle.

15 Claims, 4 Drawing Sheets

(51) Int. Cl.
| | |
|---|---|
| H01F 27/28 | (2006.01) |
| B60L 53/12 | (2019.01) |
| B60L 53/30 | (2019.01) |
| H01F 3/10 | (2006.01) |
| H01F 41/04 | (2006.01) |

(52) U.S. Cl.
 CPC .............. *H01F 27/28* (2013.01); *H02J 50/10* (2016.02); *H01F 41/04* (2013.01); *Y02T 10/7005* (2013.01); *Y02T 10/7088* (2013.01); *Y02T 90/12* (2013.01); *Y02T 90/122* (2013.01); *Y02T 90/14* (2013.01)

(58) Field of Classification Search
 CPC .. B60L 53/30; Y02T 10/7005; Y02T 10/7088; Y02T 90/12; Y02T 90/122; Y02T 90/14
 USPC ............................................ 307/104; 191/10
 See application file for complete search history.

(56) References Cited

U.S. PATENT DOCUMENTS

| | | | |
|---|---|---|---|
| 9,745,703 | B2 | 8/2017 | Curran et al. |
| 9,806,540 | B2 | 10/2017 | Anders et al. |
| 2013/0229061 | A1 | 9/2013 | Budhia et al. |
| 2016/0301250 | A1 | 10/2016 | Woronowicz et al. |
| 2016/0308394 | A1 | 10/2016 | Abdolkhani et al. |
| 2017/0080815 | A1 | 3/2017 | Wechsler et al. |

FOREIGN PATENT DOCUMENTS

| | | |
|---|---|---|
| GB | 2512855 A | 10/2014 |
| GB | 2512864 A | 10/2014 |
| WO | 2010000494 A1 | 1/2010 |
| WO | 2011145953 A1 | 11/2011 |
| WO | 2014166942 A2 | 10/2014 |
| WO | 2015072863 A1 | 5/2015 |
| WO | 2015075026 A1 | 5/2015 |
| WO | 2015128450 A1 | 9/2015 |

PRIMARY SIDED-ARRANGEMENT OF PRIMARY WINDING STRUCTURES, A METHOD OF MANUFACTURING THE PRIMARY-SIDED ARRANGEMENT, A SYSTEM FOR INDUCTIVE POWER TRANSFER AND A METHOD FOR INDUCTIVELY SUPPLYING POWER TO A VEHICLE

CROSS-REFERENCE TO RELATED APPLICATIONS

This application is the United States national phase of International Application No. PCT/EP2016/064557 filed Jun. 23, 2016, and claims priority to United Kingdom Patent Application Nos. 1511259.2, 1512275.7, and 1607032.8, filed Jun. 26, 2015, Jul. 14, 2015, and Apr. 22, 2016, respectively, the disclosures of which are hereby incorporated in their entirety by reference.

BACKGROUND OF THE INVENTION

Field of the Invention

The invention relates to a primary-sided arrangement of primary winding structures of a system for inductive power transfer. Further, the invention relates to a method of manufacturing such a system. Further, the invention relates to such a system for inductive power transfer and a method for inductively transferring power to a vehicle.

Description of Related Art

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of winding structures. A first set is installed on the ground (primary winding structures) and can be fed by a wayside power converter (WPC). The second set of windings (secondary winding structures) is installed on the vehicle. For example, the second set of windings can be attached underneath the vehicle, in the case of trams under some of its wagons. For an automobile it can be attached to the vehicle chassis. The secondary winding structure(s) or, generally, the secondary side is often referred to as pick-up-arrangement or receiver or is a part thereof. The primary winding structure(s) and the secondary winding structure(s) form a high frequency transformer to transfer electric energy to the vehicle. This can be done in a static state (when there is no movement of the vehicle) and in a dynamic state (when the vehicle moves).

In particular in the case of road automobiles, a stationary primary unit comprises a plurality of elements which are often arranged spatially separated.

WO 2011/145953 A1 discloses a three-phase topology with three looped conductors. The conductors overlap each other such that a current phase differs by 60° in each adjacent conductor which creates a travelling field along the length of the track. The pitch of the track disclosed in WO 2011/145953 A1 is provided such that a pitch between successive loop sections of a first conductor providing a first phase line to a second conductor providing a second phase line is ⅔ of a length of one loop, wherein the pitch between corresponding loop sections of the first conductor and a third conductor providing a third phase line is 4/3 of the length. This results from the balanced mutual coupling between the phases which is stated as a feature of the three phase track topology disclosed in WO 2011/145953 A1. WO 2011/145953 is incorporated by reference herein in its entirety.

WO 2015/075026 A1 describes a method of operating a three phase primary winding structure and a primary unit. WO 2015/075026 is incorporated by reference herein in its entirety.

There is the technical problem of providing a primary-sided arrangement of primary winding structures of a system for inductive power transfer, a system for inductive power transfer and a method of inductively transferring power to a vehicle, wherein the efficiency of the power transfer is maximized for varying relative positions and/or orientations between the primary winding structure and the secondary winding structure.

SUMMARY OF THE INVENTION

The solution to said technical problem is provided by the subject-matter of the present disclosure.

A primary-sided arrangement of primary winding structures of or for a system for inductive power transfer is proposed. The system can be a system for inductive power transfer to a vehicle. The primary-sided arrangement of primary winding structures can be part of a so-called inductive power transfer pad or charging pad. Such a pad can be installed on the surface of a route or a parking space or integrated within such a surface. The primary winding structure(s) generate an alternating (electro-) magnetic field if the primary winding structures are energized or supplied with operating currents. This electromagnetic field can be received by one or more secondary winding structure(s).

In the following, a primary winding structure can also be referred to as winding structure. The primary-sided arrangement comprises at least three phase lines and at least one winding structure per phase line. A winding structure can be provided by one or more conductor(s). The phase line can be provided by a winding structure or vice versa.

Each winding structure comprises at least one subwinding structure. Such a subwinding structure is preferably made of one pole of a phase line. A subwinding structure can be provided by at least one section of the winding structure. In particular, a subwinding structure can provide a loop or a coil, wherein the loop or coil is provided by at one or multiple section(s) of the winding structure.

The winding structures extend along al longitudinal axis of the primary-sided arrangement. Preferably, a winding structure comprises multiple subwinding structures which extend along the longitudinal axis of the primary-sided arrangement, which can be parallel to a longitudinal axis of one winding structure. In this case, successive subwinding structures of the winding structure can be arranged adjacent to one another along said longitudinal axis. Adjacent to each other can mean that central axes of the subwindings, in particular the axes of symmetry, are spaced apart from another, e.g. with a predetermined distance along the longitudinal axis. A loop or coil can be circular-shaped, oval-shaped or rectangular-shaped. Of course, other geometrical shapes are also possible. The longitudinal axis of the primary-sided arrangement can e.g. be parallel to a desired direction of travel of a vehicle driving above the primary winding structure into a charging position.

Neighbouring or adjacent subwindings can be counter-oriented. This can mean that a current flow in a first subwinding is oriented clockwise, wherein the current flow in the neighbouring or adjacent second subwinding is counter-clockwise. The clockwise direction can be defined with respect to the parallel central axes which point into the same direction. If a current flows through the said subwindings, adjacent subwindings will generate a magnetic field of the same magnitude but oriented in opposite direction.

The winding structure can, in particular, be provided by flat subwinding structures, in particular flat loops or coils. This means that the winding structure is substantially arranged within a two-dimensional plane. Each subwinding structure can provide one pole of the respective phase line if the winding structure is energized with an alternating current.

The longitudinal axis of the primary-sided arrangement denotes an axis along which the at least one subwinding structure of each of the at least three winding structures extend. This means, that each of the at least three winding structures comprises at least one section which extends along said longitudinal axis. Corresponding subwinding structures of the at least three winding structures, for example the first subwinding structure of each winding structure, are arranged with a predetermined displacement from one another along said longitudinal axis. This displacement can be referred to as pitch between corresponding subwinding structures. Corresponding subwinding structures of each winding structure can denote the subwinding structures with the same position in the sequence of subwinding structures along the longitudinal axis, i.e. the first subwinding structure of each winding structure, the second subwinding structure of each winding structure and so on. The longitudinal axis can also be defined as an axis along which poles or pole pairs are located.

It is possible that a first winding structure, a second winding structure and at least a third winding structure each comprise at least one winding section which extends along the longitudinal axis and at least one winding section which extends along a lateral axis. The lateral axis can be oriented orthogonal to the longitudinal axis. The lateral and longitudinal axes can span the aforementioned plane in which the winding structure is substantially arranged. The longitudinal axis and the lateral axis can both be oriented perpendicular to a vertical axis, wherein the vertical axis can be oriented parallel to an axis of symmetry of a subwinding structure and oriented from the primary-sided arrangement towards a secondary-sided arrangement. The vertical axis can, in particular, be parallel to the main direction of power transfer. Directional terms referring to a direction such as "above", "under", "ahead", "beside" can relate to the aforementioned longitudinal, lateral and vertical axes.

The winding structure, in particular each subwinding structure, can thus be provided by sections extending substantially or completely parallel to the longitudinal axis and sections extending substantially or completely parallel to the lateral axis. In particular, each subwinding can be provided by two sections extending substantially or completely parallel to the longitudinal axis and two sections extending substantially or completely parallel to the lateral axis. The sections extending parallel to the lateral axis can also be referred to as active sections.

According to the invention, a pitch between corresponding subwinding structures of the winding structures varies along the longitudinal axis. The pitch can denote the distance between corresponding subwinding structures of the winding structures along the longitudinal axis. The pitch can e.g. be the distance between geometric centres of the said subwinding structures along the longitudinal axis. Also, the pitch can e.g. be the distance of rear end active sections of the said subwinding structures along the longitudinal axis.

The feature that the pitch between corresponding subwinding structures varies along the longitudinal axis can mean that the pitch between the subwinding structures of at least one pair of corresponding subwinding structures of a set of two winding structures is different from the pitches between the subwinding structures of the remaining pair(s) of corresponding subwinding structures of said set of two winding structures. The feature that the pitch between corresponding subwinding structures varies along the longitudinal axis can also mean that the pitch between the subwinding structures of at least one pair of corresponding subwinding structures is different from the pitches between the subwinding structures of all remaining pair(s) of corresponding subwinding structures of the set of all winding structures.

It is, for instance, possible that the pitch between the first subwinding of the first winding structure and the first subwinding of the second winding structure is different from the pitch between the second subwinding of the first winding structure and the second subwinding of the second winding structure.

It is, for instance, also possible that the pitch between the first subwinding of the first winding structure and the first subwinding of the second winding structure is different from the pitch between the first subwinding of the second winding structure and the first subwinding of the third winding structure.

The pitch between corresponding subwinding structures and the phase shift between the operating currents can define the so-called pole pitch between adjacent pole pairs along the longitudinal axis of the primary-sided arrangement. In particular, the pole pitch can be equal to the length of one subwinding structure.

In general, the pitches between two corresponding subwinding structures can be design variable within a method of manufacturing the primary-sided arrangement.

Alternatively or in addition, a length of the subwinding structures of the winding structures along the longitudinal axis varies. The length can be defined as the dimension of the subwinding structure, in particular the maximum dimension, along the longitudinal axis.

The feature that the length of the subwinding structures varies along the longitudinal axis can mean that the length of at least one subwinding structure of a specific winding structure is different from the lengths of the remaining subwinding structure(s) of the specific winding structure. The feature that the length of the subwinding structures varies along the length can also mean that the length of at least one subwinding structure of all winding structures is different from the lengths of the remaining subwinding structure(s). It is possible that corresponding subwinding structures have the same length.

In general, the lengths of the subwinding structures can be design variables within the method of manufacturing the primary-sided arrangement.

Under normal operating conditions, the first winding structure is energized or energizable by a first operating current wherein the second winding structure is energized or energizable by a second operating current. A third winding structure is energized or energizable by a third operating current. A phase shift between the first and the second operating current can be 120°, wherein a phase shift between a first and the third operating current can be 240°. A phase shift between the operating currents can also be adapted to the pitch between the respective winding structures, wherein the total length of two adjacent subwinding structures can correspond to 360°.

The proposed primary-sided arrangement advantageously allows to improve the efficiency of inductive power transfer if a secondary winding structure can be arranged with different positions and/or orientations relative to the primary winding structure. In particular, the minimum efficiency for a selected set of different positions and/or orientations can be maximized by adapting the pitches and/or the length of subwinding structures.

In another embodiment, a pitch between corresponding subwinding structures of the first winding structure and the third winding structure is smaller than the pitch between corresponding subwinding structures of the first winding structure and the second winding structure. In this case, the subwindings of all winding structures can be corresponding subwinding structures.

As a result, and in contrast to the disclosure of WO 2011/145953 A1, the third winding structure is set back along the longitudinal axis. This, however, results in a non-symmetrical mutual coupling between the different winding structures. As an advantage, less installation space is required for the primary-sided arrangement, in particular less installation space along the longitudinal axis.

Pitches between corresponding subwinding structures of the first winding structure and the second winding structure can be chosen from an interval of 0 (exclusive) to 1 (exclusive) of the length of the respective subwinding structure of the first or second winding structure and the pitch between corresponding subwinding structures of the first winding structure and the third winding structure can also be chosen from an interval of 0 (exclusive) to 1 (exclusive) of the length of the respective subwinding structure of the first or third winding structure.

Preferably, the pitch between corresponding subwinding structures of the first winding structure and the second winding structure is chosen from an interval of ½ (inclusive) to 1 (exclusive) of the length of the respective subwinding structure of the first or second winding structure. A pitch between corresponding subwinding structures of the first winding structure and the third winding structure can then be chosen from an interval of 0 (exclusive) to ½ (exclusive) of the length of the respective subwinding structure of the first or third winding structure.

More preferably, the pitch between corresponding subwinding structures of the first winding structure and the second winding structure can be chosen from an interval of ⅓ (inclusive) to 1 (exclusive) of the length of the respective subwinding structure of the first or second winding structure. A pitch between corresponding subwinding structures of the first winding structure and the third winding structure can then be chosen from an interval of 0 (exclusive) to ⅓ (exclusive) of the length of the respective subwinding structure of the first or third winding structure.

Further, the pitches between corresponding subwinding structures of the first winding structure and the second winding structure can be equal to the corresponding pitches between corresponding subwinding structures of the first winding structure and the third winding structure.

In another embodiment, a length of the subwinding structures of the winding structures along the longitudinal axis varies in the range of ½ to 3/2 of a standardized length. The standardized length can e.g. be an average length of the set of all lengths. This means that the variation of the length is restricted.

Preferably, the individual pitch between two subwinding structures can be dependent on a distance between the primary winding structure and the secondary winding structure, in particular a distance between the two centres of the primary and secondary winding structures. The centres may be magnetic, geometric or density centres of the primary and secondary winding structures. The distance may also be equal to the size, i.e. height, of the air gap between the primary and secondary winding structure. The ratio of the pitch to the distance can be greater than 3, in particular greater than 5. The ratio between pitch and the distance can also be in the range of 0.5 to 60, in particular in the range of 0.5 to 50, preferably in the range of 0.5 to 10.

In another embodiment, corresponding subwinding structures are designed and/or arranged such that directions of the magnetic fluxes generated by the first subwinding structure of the first and second winding structure are oriented in the same direction, wherein said direction is oriented opposite to the direction of the magnetic flux generated by the first subwinding structure of the third winding structure if either a positive or negative current flows through the corresponding subwindings.

In particular, subwinding structures of the third winding structure can be arranged counter-oriented with respect to the corresponding subwinding structure of the first and the second winding structure. This can mean that a current flow in the first and second subwinding of the first winding structure is oriented clockwise, wherein the current flow current in the corresponding first subwinding of the third winding structure is oriented counter-clockwise if the current in all corresponding subwindings is either a positive or negative current.

The flow direction of a positive current can e.g. point from a feeding point of the respective winding structure to a star point by which all winding structures are connected. Also, the flow direction of a positive current can e.g. point from a feeding point of the respective winding structure to a connection point with a reference potential which is a common reference potential of all winding structures.

The feeding point can e.g. denote an electrical connection point of the winding structure. A feeding point can e.g. be provided by a connector. Alternatively, a winding structure can be electrically connected to a feed line section, wherein an end of the feed line section provides the feeding point. The feeding point of a winding structure can e.g. be connected to a central point of a switching leg of an inverter by which the operating currents are provided to the winding structure. The central point can be a point of the connection between the two switching elements of the switching leg. The flow direction of a positive current can e.g. point from the central point to the feeding point.

The inverter can be part of the proposed arrangement. In particular, the inverter can comprises three switching legs, wherein each switching leg is provided by the serial connection of two switching elements. The feeding point of each winding structure is electrically connected to a central point of one of the switching legs.

This advantageously allows providing a small ratio between the generated stray field and the generated power transfer field. Further, a position of a local maximum of the flux density can be adjusted to a desired position. This advantageously allows adapting the generated power transfer field to different positions of a secondary winding structure relative to the primary winding structure. Thus, the magnetic coupling between the primary winding structures and the secondary winding structure can be maximized while the magnetic coupling between the primary winding structures and other structures, e.g a vehicle chassis, can be minimized.

As an alternative to said design and/or arrangement, corresponding subwinding structures can be designed and/or arranged such that a direction of the magnetic flux generated by the first subwinding structure of the first and second winding structure is equal to the direction of the magnetic flux generated by the first subwinding structure of the third winding structure if either a positive or negative current flows through the corresponding subwindings. If such a design and/or arrangement of the subwinding structures is provided, the phase angle of an operating current for the third winding structure can be shifted or adjusted by −180° or +180°. This means that if a positive current is applied to or flows through the subwinding structures of the first and the second winding structure, a negative current is applied to or flows through the subwinding structure of the third winding structure. Further, if a negative current is applied to or flows through the subwinding structures of the first and the second winding structure, a positive current is applied to or flows through the subwinding structure of the third winding structure.

As a result, directions of the magnetic fluxes generated by the first subwinding structure of the first and second winding structure are oriented in the same direction, wherein said direction is oriented opposite to the direction of the magnetic flux generated by the first subwinding structure of the third winding structure.

In another embodiment, at least one feeding point of the first subwinding structure of the first winding structure and at least one feeding point of the first subwinding structure of the second winding structure are arranged on a first lateral side of the arrangement, wherein at least one feeding point of the first subwinding structure of the third winding structure is arranged on a second lateral side of the arrangement. This advantageously provides a simple mechanical design for providing the counter-oriented corresponding subwindings of the winding structures.

Within the proposed arrangement, corresponding subwinding structures of the first winding structure and/or the second winding structure and/or the third winding structure can overlap each other at least partially. In this case, each winding structure can be arranged in a plane, wherein the planes are arranged at different vertical positions along the vertical axis. This advantageously further reduces the installation space requirements.

Further, the primary-sided arrangement can comprise at least one magnetically conducting element or an arrangement of multiple magnetically conducting elements. The magnetically conducting element can also be referred to as flux guiding element. The flux guiding element is used to guide a magnetic flux of the electromagnetic field which is generated by the primary-sided arrangement. The magnetically conducting element can e.g. be a ferrite element or can comprise one or multiple ferrite element(s).

The at least one magnetically conducting element can be arranged under the winding structures. Alternatively or in addition, the at least one magnetically conducting element or one element of the arrangement of multiple elements can be arranged at least partially or fully within the plane in which one winding structure is arranged. In particular, the at least one magnetically conducting element can be arranged within or can extend into a volume or area enclosed by one subwinding structure.

The at least one magnetically conducting element or the arrangement of multiple elements can extend along the longitudinal axis. In particular, the at least one magnetically conducting element can be a strip-like or elongated element. In other words, the at least one magnetically conducting element can be a bar element, e.g. a ferrite bar. This advantageously allows decreasing the magnetic flux extending away from the primary-sided arrangement in an unwanted direction.

A bar element can have a constant height along its length. In this case, the bar element can have a cuboid shape. Alternatively, a bar element can have a varying height along its length. In particular, a bar element can have at least one section with a constant height and at least one section with an increasing height. The height can be measured along the vertical axis of the primary winding structure.

Further, the arrangement of magnetically conducting elements can comprise multiple bar elements. These bar elements can be arranged such that the bar elements extend along the longitudinal axis. Multiple bar elements can be arranged along or parallel to a straight line parallel to the longitudinal axis, wherein these multiple bar elements can abut or overlap at front end or rear sections of the bar elements. Such an arrangement can also be referred to as row of bar elements.

It is possible that the arrangement of multiple bar elements comprises multiple rows, wherein each row comprises one or multiple bar elements.

Further, the arrangement of magnetically conducting elements can comprise multiple rows of at least one magnetically conductive element, wherein a non-zero gap between two adjacent or successive rows is provided along the lateral direction. Each row comprises one or multiple bar elements extending along a line parallel to the longitudinal axis. The rows are spaced apart from another along or parallel to the lateral axis. The distance between two adjacent rows can be chosen from an interval of 0 mm (exclusive) to 50 mm (inclusive), preferably to 30 mm (inclusive). The non-zero gap advantageously allows to adjust or to provide a desired flux density within the volume or area enclosed by the subwinding structure.

Further, at least two magnetically conductive elements can overlap each other. In particular, the at least two bar elements can overlap each other at a front end or rear end section of the bar elements. More particular, two successive bar elements of one row of multiple bar elements can overlap. This can mean that the at least two bar elements are arranged at different vertical positions along the aforementioned vertical axis.

Further, the at least one magnetically conducting element or an arrangement of magnetically conducting elements can provide a recess. The recess can receive at least a section of a winding structure, in particular of a subwinding structure. Further in particular, the recess can be arranged and/or designed in order to receive a section of a winding structure extending along or parallel to the lateral axis. More particular, the recess can be designed and/or arranged such that a section of a winding structure at the transition from one subwinding structure to the successive subwinding structure along the longitudinal axis can be arranged within the recess.

If an arrangement of multiple magnetically conductive elements comprises one or multiple rows of more than one magnetically conductive element, the magnetically conductive elements of one row can be arranged such that a recess is provided. The recess can e.g. be provided if only end sections of a second magnetically conductive element in the row, in particular an elongated element, overlap end sections of a first and a third magnetically conductive element in the row, respectively. The recess can then be provided between the first and the third magnetically conductive element. The width of the recess can be adapted to the width of the section of the primary winding structure to be received. In other words, magnetically conducting elements of an arrangement of multiple magnetically conductive elements can be arranged in a row. In this case, multiple magnetically conductive elements can be arranged successively along the longitudinal axis of the primary winding structure. Further, at least two successive magnetically conductive elements are aligned with a vertical offset to one another. This can mean that a non-zero distance between the longitudinal axes of two successive magnetically conductive elements is provided along the vertical axis of the primary winding structure. Further, there can be no vertical offset between every second magnetically conductive element of the row. The vertical offset can provide the recess. This advantageously further reduces an installation space requirement and increases the magnetic coupling between the primary and secondary winding structure.

Further, at least one section of at least one magnetically conductive element can extend into one subwinding structure. This can mean that the at least one section extends into a volume or area enclosed by the subwinding structure. This advantageously further reduces an installation space requirement.

In other words, at least one section of at least one magnetically conductive element can be arranged within the volume or area enclosed by a subwinding structure. A height of a magnetically conductive element which is arranged within the volume enclosed by a subwinding structure can be larger than, equal to or smaller than the height of the subwinding structure. This advantageously further reduces an installation space requirement. Further, the arrangement of a magnetically conductive element within the volume advantageously increases the amount of field lines of the alternating electromagnetic field which extend through said volume as the magnetically conductive element serves as a field collector.

It is possible that 30% to 70%, preferably 45% to 55%, of the volume enclosed by the subwinding structure is filled with one or multiple magnetically conductive elements.

If an arrangement of multiple magnetically conductive elements comprises one or multiple rows of more than one magnetically conductive element, the magnetically conductive elements of one row can be arranged such that at least one section of the winding structure is arranged within the recess provided by the row, wherein a section of the row is arranged within the volume or area enclosed by a subwinding structure.

It is, for instance, possible that one row comprises upper magnetically conductive elements and at least one or multiple lower magnetically conductive element/s, wherein the upper magnetically conductive elements are arranged within a volume or area enclosed by subwinding structures, wherein an lower magnetically conductive element bridges the section of the winding structure between the volumes of two adjacent subwinding structures. In this case, a first end section of the lower magnetically conductive element can overlap an end section of a first upper magnetically conductive element, wherein another end section of the lower magnetically conductive element overlaps an end section of a second upper magnetically conductive element. The recess is provided between the upper magnetically conductive elements.

In a cross section, this arrangement of magnetically conductive elements in the row provides a hat-like structure.

Moreover, magnetically conducting elements of an arrangement of multiple magnetically conductive elements can be arranged in a row. In this case, multiple magnetically conductive elements can be arranged successively along the longitudinal axis of the primary winding structure. Further, at least two successive magnetically conductive elements are aligned with a lateral offset to one another. This can mean that a non-zero distance between the longitudinal axes of two successive magnetically conductive elements is provided along the lateral axis of the primary winding structure. The lateral offset can be provided along or against the lateral axis of the primary winding structure. Further, there can be no lateral offset between every second magnetically conductive element of the row.

The arrangement can have multiple rows, wherein a lateral offset between two successive magnetically conductive elements is only provided in selected but not in all rows. This means that the arrangement comprises one or more rows in which multiple magnetically conductive elements are arranged along the longitudinal axis of the primary winding structure with no lateral offset and one or more rows in which at least two successive magnetically conductive elements are arranged along the longitudinal axis with the said lateral offset.

It is, of course, possible that in addition to a lateral offset, a vertical offset is provided between two successive magnetically conductive elements of one row.

By providing the lateral offset, it is possible to vary, e.g. increase, the gap between two adjacent rows along the lateral direction. This allows to arrange other components between the two adjacent rows, e.g. fixation means.

Further, the primary-sided arrangement can comprise at least one cable bearing element. The cable bearing element can denote an element adapted to position and/or to hold at least one winding structure or a part thereof, preferably all winding structures. In particular, the cable bearing element can be adapted to position and/or to hold a plurality of line sections of one or more electric lines which can provide the phase line(s) of the primary-sided arrangement.

The cable bearing element can comprises recesses forming spaces and/or projections delimiting spaces for receiving at least a section of a winding structure. A section of a winding structure can be provided by a section of a line or of a conductor. The winding structure can extend through these spaces.

Further, the cable bearing element can be adapted to position and/or to hold at least one magnetically conductive element, preferably the magnetically conductive element(s) which is/are arranged within the volume enclosed by the subwinding structures. The cable bearing element can be provided by a casting. Preferably, the cable bearing element is provided by a magnetically non-conductive material, e.g. plastic.

The cable bearing element can be formed as a shaped block which is described e.g. in GB 2485616 A or in GB 2505516 A. Therefore, the disclosure of GB 2485616 A and GB 2505516 A1, in particular the claimed embodiments, is/are incorporated into the present description by reference. Preferably, at least one end section of the cable bearing element can have a tapered or frustum shape. The cable bearing element can be arranged within a housing, in particular within an inner volume of the housing of an IPT pad.

The cable bearing element can be made of a magnetically non-conductive material, e.g. plastic or concrete or polymer.

Further, a position of the primary-sided arrangement can be adjustable at least along the vertical direction. It is, for instance, possible that the primary-sided arrangement is part of a primary unit, wherein the primary unit comprises a stationary part and a movable part. The movable part can comprise the primary-sided arrangement. Alternatively, the primary sided-arrangement can be attached to the movable part. Further, the movable part can be movable between a retracted state and an extended state.

The primary-sided arrangement can be part of a primary unit. The primary unit can e.g. comprise an inductive power transfer pad or be provided by such a transfer pad. Corresponding power transfer pad is disclosed in WO 2015/128450 A1. Thus, the disclosure of WO 2015/128450 A1, in particular the claimed embodiments, are fully incorporated by reference into this disclosure.

The primary unit can further comprise an inverter. The inverter can be arranged within a housing of the primary unit. An input side of the inverter can be electrically coupled to a connecting terminal of the primary unit, wherein an output side of the inverter can be electrically coupled to the winding structures of the primary-sided arrangement. Further, the primary unit can comprise a rectifier, wherein the inverter can be coupled to the connecting terminal via the rectifier. The connecting terminal of the primary unit can be connectable or connected to an AC current generator. Further, the primary unit can comprise another connecting terminal, wherein the inverter can be coupled directly to the other connecting terminal. The other connecting terminal of the primary unit can be connectable or connected to a DC current generator, wherein a desired voltage is generable by the DC generator.

Further, the primary unit can comprise a control unit for controlling an operation of the inverter. Further, the primary unit can comprise a vehicle detection system. The vehicle detection system can comprise a RFID unit.

Further, the primary unit can comprise a compensating unit for compensating a self-inductance of the primary winding structures. Further, the primary unit can comprise foreign object detection system. Further, the foreign object detection system can be a metal object detection system. Alternatively or in addition, the object detection system can be a moving object detection system. Further, the primary unit can comprise a human machine interface and/or a signal transmitting or receiving means.

Such a primary unit is e.g. disclosed in WO 2014/166942 A2. Thus, the disclosure of WO 2014/166942 A2, in particular the claimed embodiments, is fully incorporated by reference into this disclosure.

The primary winding structures can further be operated or energized by a wayside power converter (WPC). Such a wayside power converter is e.g. disclosed in WO 2010/000494 A1. Thus, the disclosure of WO 2010/000494 A1, is fully incorporated by reference into this disclosure. The WPC can be provided by the aforementioned inverter.

Further proposed is a system for inductive power transfer, wherein the system comprises a primary-sided arrangement of primary winding structures according to one of the embodiments described in this invention. Further, the system comprises a secondary-sided arrangement of at least one secondary winding structure, wherein the secondary arrangement comprises at least one phase line and one winding structure per phase line.

The secondary winding structure(s) can be designed similar to the primary winding structure(s). The winding structure of the secondary arrangement can e.g. comprise one or two or more than two subwinding structure(s). At least one subwinding can provide a loop or a coil. The subwinding can be provided by at least one section of the winding structure. Also, the subwinding can provide or form a coil or a loop, e.g. with a predetermined number of turns, wherein the loop or coil is provided by at one or multiple section(s) of the winding structure.

A winding structure can be provided by one or more conductor(s). The phase line can be provided by a winding structure or vice versa.

The secondary winding structure extends along a longitudinal axis of the secondary-sided arrangement. Preferably, the secondary winding structure comprises two or more than two subwinding structures which extend along the longitudinal axis of the secondary-sided arrangement, which can be parallel to a longitudinal axis of one winding structure. In this case, successive subwinding structures of the winding structure can be arranged adjacent to one another along said longitudinal axis. A loop or coil can be circular-shaped, oval-shaped or rectangular-shaped. Of course, other geometrical shapes are also possible.

The winding structure can, in particular, be provided by flat subwinding structures, in particular flat loops or coils. This means that the secondary winding structure is substantially arranged within a two-dimensional plane spanned by the secondary-sided longitudinal and lateral axes.

The longitudinal axis of the secondary-sided arrangement denotes an axis along which the at least one subwinding structure of the at least one secondary winding structures extends. This means, that the secondary winding structures comprises at least one section which extends along said longitudinal axis.

The winding structure of the secondary-sided arrangement can have an even or uneven number of subwindings which are arranged adjacent to each other along the secondary-sided longitudinal axis. This secondary-sided longitudinal axis can e.g. be parallel to a roll axis of the vehicle.

In an aligned state of the primary-sided arrangement and the secondary-sided arrangement, the longitudinal axis of the primary-sided arrangement and the longitudinal axis of the secondary-sided arrangement can be parallel. Further, the at least one winding structure of the secondary-sided arrangement can comprise at least one winding section which extends along a secondary-sided lateral axis which is oriented perpendicular to the secondary-sided longitudinal axis. In the aligned state, the primary-sided lateral axis and the secondary-sided lateral axis can also be oriented parallel. The secondary-sided lateral axis can be oriented parallel to a pitch axis of the vehicle.

Preferably, the secondary winding structure comprises two adjacent or successive subwindings. Also, neighbouring or adjacent subwindings can be counter-oriented.

Regarding the secondary-sided arrangement, as in the case of the primary-sided arrangement, a pitch between corresponding subwinding structures of said winding structures can vary along the longitudinal axis of the secondary-sided arrangement, in particular in the case where the secondary-sided arrangement comprises multiple secondary winding structures. Alternatively or in addition, a length of the subwinding structures of one secondary winding structure can vary along the longitudinal axis of the secondary-sided arrangement.

The secondary-sided arrangement can be part of a secondary unit or receiving unit which can also be referred to as pick-up. The secondary unit can further comprise a rectifier, at least one compensating capacitance, means for supervising a temperature of the secondary unit, at least one control unit, e.g. a micro controller, and/or at least one communication means. The at least one communication means can be used for exchanging or transmitting data with a corresponding primary unit, e.g. via WLAN or Bluetooth™ or any other wireless communication.

The system can e.g. be designed such that an electric power of 3.6 kW can be transferred to a vehicle. The vehicle can, in particular, be an automobile.

The winding structure of the secondary-sided arrangement can provide at least one, two or even more poles. Preferably, the secondary-sided arrangement comprises exactly one secondary winding structure. The longitudinal axis of the secondary-sided arrangement can be oriented parallel to a direction of travel of the vehicle if the vehicle drives straight forward.

Further, the secondary-sided arrangement can comprise at least one magnetically conducting element or an arrangement of magnetically conducting elements.

The at least one magnetically conducting element or the arrangement of magnetically conducting elements can be designed and/or arranged in a similar manner as the at least one magnetically conducting element or arrangement of magnetically conducting elements of the primary-sided arrangement. Thus, all details or aspects related to the primary-sided magnetically conducting element or arrangement of magnetically conducting elements apply to the arrangement of the secondary-sided arrangement in the same manner. A reference coordinate system for the secondary-sided arrangement is provided by the aforementioned secondary-sided longitudinal and lateral axes. A vertical axis of this reference coordinate system is oriented orthogonal to said longitudinal and lateral axis. The vertical axis of the reference coordinate system of the secondary-sided arrangement can be oriented in the same direction as the vertical axis of the reference coordinate system of the primary-sided arrangement. In contrast to the arrangement of the at least one magnetically conducting element or the arrangement of multiple arrangements of the primary-sided arrangement, however, the at least one magnetically conducting element or the arrangement of multiple magnetically conducting elements of the secondary-sided arrangement can be arranged above the winding structure.

In particular, the at least one magnetically conducting element or an arrangement of magnetically conducting elements of the secondary-sided arrangement can provide a recess. The recess can receive at least a section of a winding structure, in particular of a subwinding structure. Further in particular, the recess can be arranged and/or designed in order to receive a section of a winding structure extending along or parallel to the lateral axis. More particular, the recess can be designed and/or arranged such that a section of a winding structure at the transition from one subwinding structure to the successive subwinding structure along the longitudinal axis can be arranged within the recess.

If an arrangement of multiple magnetically conductive elements of the secondary-sided arrangement comprises one or multiple rows of more than one magnetically conductive element, the magnetically conductive elements of one row can be arranged such that a recess is provided. The recess can e.g. be provided if only end sections of a second magnetically conductive element in the row, in particular an elongated element, overlap end sections of a first and a third magnetically conductive element in the row, respectively. The recess can then be provided between the first and the third magnetically conductive element. The width of the recess can be adapted to the width of the section of the secondary winding structure to be received.

Further, at least two successive magnetically conductive elements are aligned with a vertical offset to one another. This can mean that a non-zero distance between the longitudinal axes of two successive magnetically conductive elements is provided along the vertical axis of the primary winding structure. Further, there can be no vertical offset between every second magnetically conductive element of the row. The vertical offset can provide the recess. This advantageously further reduces an installation space requirement and increases the magnetic coupling between the primary and secondary winding structure.

Further, the at least one magnetically conducting element or the arrangement of magnetically conducting elements of the secondary-sided arrangement can be designed such that in an aligned state of the primary-sided and the secondary-sided arrangement, the at least one magnetically conducting element of the secondary-sided arrangement extends into or parallel to the primary-sided longitudinal axis.

In particular, rows of magnetically conductive element(s) of the secondary-sided and of the primary-sided arrangement can be arranged opposite to each other with reference to the vertical axis in the aligned state.

Further proposed is a method of manufacturing a primary-sided arrangement of primary winding structures, wherein the primary-sided arrangement comprises at least three phase lines. Further, at least one winding structure per phase line is provided, wherein each winding structure comprises at least one subwinding structure. The winding structures are arranged such that the subwinding structures extend along a longitudinal axis of the primary-sided arrangement.

According to the invention, a pitch between corresponding subwinding structures of the winding structures along the longitudinal axis and/or a length of the subwinding structures of the winding structures along the longitudinal axis is varied.

Further, the pitch and/or length can be varied such that a predetermined total length of the primary-sided arrangement is provided. This advantageously allows adjusting the primary-sided arrangement to a desired building space.

The proposed method advantageously allows manufacturing or designing a primary-sided arrangement according to one of the embodiments described in this invention. The proposed method can comprise all steps necessary for manufacturing such a primary-sided arrangement.

In another embodiment, the pitch and/or the length is/are varied such that a variation of a secondary-sided output voltage provided by at least one predetermined secondary winding structure in different positions and/or orientations relative to the primary-sided arrangement is minimized. The predetermined secondary winding structure can have a known design.

It is also possible to vary the pitch and/or the length such that a variation of a secondary-sided output voltage provided by each secondary winding structure of a set of predetermined secondary winding structures in different positions and/or orientations relative to the primary-sided arrangement is minimized.

The secondary-sided output voltage can be an alternating current output voltage provided by the secondary winding structure upon reception of the electromagnetic field generated by the primary-sided arrangement. Alternatively, the secondary-sided output voltage can be rectified output voltage of the secondary winding structure which is provided by rectifying the alternating current output voltage provided by the secondary winding structure by a known rectifier. The secondary-sided output voltage can be determined via simulation or via a field testing.

The secondary-sided output voltage will vary for different positions and/or orientations of the secondary winding structure relative to the primary winding structure. This variation can be minimized by adjusting the pitch and/or length.

The pitch(es) and/or the length(s) can be design variables in an optimization problem, wherein the cost function depends on the secondary-sided output voltage. Thus, the pitch(es) and/or the length(s) can be determined by an optimization procedure.

In particular, the pitch(es) and/or the length(s) can be determined by a minimax optimization procedure, wherein the minimal secondary-sided rectified output voltage is maximized for selected or all positions and/or orientations relative to the primary-sided arrangement. It is, for instance, possible to divide the set of all possible positions and/or orientations within an active volume of the primary-sided arrangement into multiple intervals of positions and/or orientations. Then, the minimal secondary-sided rectified output voltage in a specific interval of positions and/or orientations can be determined. Then, the pitch(es) and/or the length(s) can be determined such that the minimal secondary-sided rectified output voltage of all intervals is maximized.

It is also possible that the set of all possible positions and/or orientations within an active volume of the primary-sided arrangement is divided into multiple intervals of positions and/or orientations, wherein a set of phase shift values between the operating currents of the winding structures is assigned to each interval of positions and/or orientations, wherein the secondary-sided output voltage is determined for each interval of positions and/or orientations depending on the respective phase shift values between the operating currents.

Further proposed is a method for inductively supplying power to a vehicle. The method can be performed by a primary-sided arrangement according to one of the embodiments described in this invention or the system according to one of the embodiments described in this invention. Within the method, operating currents, in particular the aforementioned first, second and third operating currents, are supplied to the phase lines of the primary-sided arrangement. A first operating current is supplied to the first winding structure, wherein a second operating current is supplied to the second winding structure, wherein a third operating current is supplied to the third winding structure. Further, a phase shift between the first and the third operating current can be higher than a phase shift between the first and the second operating current.

Preferably, the phase shift between the first and the third operating current can be higher than a phase shift between the first and the second operating current if corresponding subwinding structures are designed and/or arranged such that a directions of the magnetic fluxes generated by the first subwinding structures of the first and second winding structure are equal, wherein said directions are oriented opposite to the direction of the magnetic flux generated by the first subwinding structure of the third winding structure, if either a positive or negative current flows through the corresponding subwindings.

Preferably, the phase shift between the first and the second operating current is 120°, wherein the phase shift between the first and the third operating current is 240°.

Alternatively, the phase shift between the first and the third operating current can be lower than a phase shift between the first and the second operating current if corresponding subwinding structures are designed and/or arranged such that directions of the magnetic fluxes generated by the first subwinding structures of the first and second winding structure are equal to the direction of the magnetic flux generated by the first subwinding structure of the third winding structure if either a positive or negative current flows through the corresponding subwindings.

Thus, an electromagnetic field is generated by the primary winding structures which is received by the at least one secondary winding structure. Further, an AC current is generated by the at least one secondary winding structure if the electromagnetic field is received.

In another embodiment, in a standard operational mode, the first operating current, the second operating current and the third operating current are controlled such that a predetermined phase shift between all three operating currents is provided.

In particular, the phase shift between the first operating current and the second operating current can be 120° phase angle. Accordingly, the phase shift between the second operating current and the third operating current can be 120° phase angle. Thus, the phase shift between the first operating current and the third operating current is 240° phase angle. Thus, in a standard operational mode, a set of non-zero phase shift values comprises two different non-zero phase shift values, for example 120° and 240°.

In other words, a first difference current between the first operating current and the second operating current, in particular a time course of the difference current, is different from a second difference current between the second operating current and the third operating current which is again different from a third difference current between the first operating current and the third operating current.

Controlling the operating currents or the phase angle of the operating current can be done by adequately controlling switching times of the switching elements of the inverter. In an alternative to controlling the phase angle of the operating currents, the phase angles of the operating voltages of the winding structures can be controlled according to the same aspects as described for the control of the operating currents.

In another embodiment, in a modified operational mode, the first operating current, the second operating current and the third operating current are controlled such that the set of phase shift values comprises at most two non-zero values and all non-zero phase shift values are equal.

The set of phase shift values can comprise three values, e.g. the value of the phase shift between the first and the second operating current, the value of the phase shift between the second and the third operating current and the value of the phase shift between the first and the third operating current.

The set of phase shift values between existing operating currents can comprise only one non-zero value. This e.g. means that the number of non-zero phase shifts is reduced to one.

Alternatively, the set of phase shift values between existing operating currents can comprise two non-zero values, wherein these values are equal. In this case, the remaining phase shift value can be zero. This means that the number of different non-zero phase shift values within the set of phase shift values is reduced. In this case, there are no non-zero phase shift values which are different from each other.

This means that the values of all phase shifts between the operating currents are either equal to a specific non-zero value or equal to zero.

In other words, only one or only two of the existing phase difference currents are non-zero. In a first alternative, there is only one difference current between the phases within the modified operational mode which is non-zero. This holds especially for the case where one of the three phase lines is switched off and thus only one phase difference current exists. Alternatively, all three phases are supplied with a corresponding operating current, wherein two of the three difference currents are equal and one of the difference currents is zero. This holds especially for the case, wherein the current course of the operating currents of two of the three operating currents are equal.

The modified operational mode can e.g. be activated depending on a geometric alignment of the primary winding structure to a secondary winding structure. This will be explained later.

This advantageously allows meeting desired power transfer criteria, especially in the case where there is a misalignment between the primary and the secondary winding structure.

It can be assumed that a reference relative position and/or orientation between the primary winding structure and the secondary winding structure exists, wherein, in the standard operational mode, the primary system is tuned at a certain operating frequency, e.g. 20 kHz, if the primary winding structure and the secondary winding structure are arranged with this reference relative position and/or orientation.

In this context, tuned can mean that no or only minimal reactive power is demanded or drawn from a wayside power supply, e.g. the WPC. In the context of this invention, the WPC can denote an inverter which can also be referred to as primary-sided inverter. In a special case, tuned can mean that the phase current and the phase voltage of each phase line are in phase, at least at the first harmonic frequency of the operating current/current. In other words, the operating frequency matches a resonant frequency of the electric circuit which is connected to the input terminal of the respective phase line. Said electric circuit does not only comprise primary-sided elements, but also secondary-sided elements which are transferred to the primary side.

If the primary winding structure and the secondary winding structure are arranged with this reference relative position and/or orientation, the primary unit and the secondary unit are aligned.

The alignment between the primary winding structure and the secondary winding structure can e.g. be expressed with reference to a primary-sided reference point and a secondary-sided reference point. A primary-sided reference point can e.g. be a geometric center of one of the phase lines, e.g. the first phase line. In particular, the reference point can be the geometric center of the first subwinding of the first phase line.

A secondary-sided reference point can be a geometric center of a phase line, in particular of the first phase line, of the secondary winding structure. In particular, the reference point can be the center point of the first subwinding of the first phase line of the secondary winding structure.

The alignment can then be expressed with respect to the primary-sided coordinate system which comprises the primary-sided longitudinal, lateral and vertical axes.

The origin of the primary-sided coordinate system can e.g. be located at the primary-sided reference point. With respect to such a primary-sided coordinate system, a relative position and/or orientation between the primary winding structure and the secondary winding structure can be expressed.

In the case of a misalignment, e.g. a deviation from the reference relative position and/or orientation, the transformer provided by the primary side and the secondary side will detune. This, in turn, will cause a drop in the power transfer performance and increase losses on the primary side, in particular within a primary-sided inverter. To compensate for said decrease in the power transfer performance, higher currents on the primary side are required which, in turn, will generate higher losses and reduce the total power transfer efficiency.

This effect especially holds for primary units with small geometric dimensions, wherein a small misalignment will result in a significant drop of the power transfer performance. In other words, primary units with small dimensions feature a lower tolerance regarding misalignment.

It is, for instance, possible that in the case of a misalignment of the secondary winding structure, e.g. of the pick-up, a large portion of the primary winding structure, in particular a portion of a phase line of the primary winding structure, will not be covered by portion of the secondary winding structure. In the context of this invention, covered means that the primary winding structure and the secondary winding structure overlap in a common plane of projection which may be oriented perpendicular to the aforementioned vertical direction. In the case of incomplete coverage, injected energy into the primary winding structure will not contribute to the inductive energy transfer process effectively.

By activating the modified operational mode in case of a misalignment, the aforementioned disadvantages, in particular the drop in the power transfer performance and the higher currents in the primary winding structure, can advantageously be fully or at least partially compensated.

In another embodiment, one of the operating currents is reduced to zero. It is important that only one of the three operating currents is reduced to zero. In other words, one of the three operating currents is switched off. The corresponding phase line is thus not operated. Thus, only two of the three input voltages exist. In this case, the set of phase shift values comprises only one value, wherein said value is a non-zero value. This effectively provides a virtual single phase system, wherein a virtual single phase line is provided between the input terminals of the operated phase lines. As will be explained later, such a virtual single phase system advantageously allows varying the operating frequency of the voltage falling across the terminals of the virtual single phase line in order to e.g. match a resonant frequency of said virtual single phase line. This, in turn, reduces a reactive power and thus increases the inductive power transfer performance.

Reducing one of the operating currents to zero is especially effective in the case of an undesired reduced air gap between the primary winding structure and the secondary winding structure. For a desired inductive power transfer, an air gap with a predetermined width, which can also be denoted as vertical displacement, needs to be provided. If the width of said air gap is reduced, e.g. due to a flat tire or a heavy load within the vehicle, extra voltages can be generated within the secondary winding structure in case of an inductive power transfer. These extra voltages can damage secondary-sided elements, e.g. the rectifier or capacitors.

By turning off one phase line, the amount of transferred energy is reduced. This, in turn, advantageously reduces or even eliminates the aforementioned extra voltages on the secondary side. Another advantage is that, compared to the standard operational mode, an input DC current to an inverter on the primary side can be reduced.

In another embodiment the remaining operating currents are controlled such that the non-zero phase shift value is 180° phase angle. If e.g. the second phase line is turned off, the phase angle of the third operating current can be increased by 60° which provides a phase shift between the first and the third operating current of 180°. By adjusting the phase shift to 180°, a higher AC voltage falls across the input terminals of the remaining phase lines. Said AC voltage can e.g. be applied to a current-shaping filter on the primary side which generates a higher current in the primary winding structure. This higher current advantageously increases the inductive energy transfer to the secondary side. However, the DC input voltage for primary-sided inverter is not increased.

In an alternative embodiment, two of the three operating currents are controlled such that their respective current curves are equal. This means that time courses of the operating currents are equal. In other words, the phase angle between each of these two (controlled) operating currents and the remaining operating current is equal.

In this case, the set of phase shift values can still comprise three values, wherein one value is zero and the remaining two values are equal and non-zero.

Such a control also provides a virtual single phase system. If e.g. the voltage curves of the second and the third operating currents are equal, the virtual single phase line is provided between the input terminal of the first phase line and the input terminals of the third and the second phase line which have the same potential. An input terminal can correspond to the feeding point of the respective winding structure. As will be explained later, such a virtual single phase system advantageously allows varying the operating frequency of the voltage falling across the terminals of the virtual single phase line in order to e.g. match a resonant frequency of said virtual single phase line. This, in turn, reduces a reactive power and thus increases the inductive power transfer performance.

Controlling two of the three operating currents such that their respective current curves are equal can e.g. increase the current within a phase line providing a fully covered section of primary winding structure, wherein currents in a phase line providing a partially-exposed section of the primary winding structure will be reduced. By reducing the current in the phase lines providing partially-exposed sections of the primary side winding structure, the amount of conduction loss within these sections of the primary side winding structure will reduce advantageously. By a higher current in the phase line providing the fully-covered primary side windings, the range of acceptable misalignments will be advantageously expanded.

In total, by activating the modified operational mode, the amount of transferred energy is distributed among the phase lines such that the most effective power transfer is provided. Especially in the case of a misalignment between the primary side winding structure and the secondary side winding structure, the primary-sided phase lines will be detuned. This is e.g. due to an increase stray inductance which is provided by the misalignment. The detuning will result in a capacitive or inductive reactance which, in turn, can lead to the effect that the phase current and phase voltage are not in phase anymore. Thus, additional reactive power has to be provided by an inverter and there is no possibility of zero current switching or zero voltage switching anymore. In case of such a detuning due to misalignment, no common frequency for the operating currents can be found which will compensate the detuning effect and provide a system which can be operated in a tuned state. The proposed modified operational mode overcomes this problem by creating the aforementioned virtual single phase line.

Further, the phase angle of at least one of the two operating currents can be shifted by a multiple of +/−60°.

WO 2015/075026 A1 describes more aspects and details related to the control in the standard operational mode and the modified operational mode. The disclosure of WO 2015/075026 A1 is, however, related to the control of phase input voltages. The disclosure of WO 2015/075026 A1 is therefore fully incorporated by reference, wherein the aspects and details concerning phase input voltages, in particular concerning the control, can also be applied to the operating currents, in particular to the control of operating currents.

Further described is an embodiment, wherein the phase shift value(s) between the operating currents can be varied such that a desired alternating current output voltage or rectified output voltage of the secondary winding structure which is generated upon reception of the electromagnetic field generated by the primary winding structure is provided. This embodiment can provide subject-matter for an independent invention. Thus, a method for inductively supplying power to a vehicle is described, wherein operating currents are supplied to the winding structures of a primary-sided arrangement, wherein a first operating current is supplied to the first winding structure, wherein a second operating current is supplied to the second winding structure and wherein a third operating current is supplied to the third winding structure. Further, the phase shift value(s) can be varied such that a desired alternating current output voltage or rectified output voltage of the secondary winding structure which is generated upon reception of the electromagnetic field generated by the primary winding structure is provided.

In particular, the phase shift value(s) can be varied depending on charging characteristics of a secondary-sided energy storage element. In particular, the phase shift value(s) can be varied depending on a state of charge of the secondary-sided energy storage element. The secondary-sided energy storage element can be an element which is electrically connected to a secondary winding structure of a system for inductive power transfer.

It is possible to vary phase shift values based on the phase shift values in an activated modified operational mode. This can also be referred to as flexible modified operational mode. In other words, the phase shift value(s) of one, two or all operating currents can be varied based on the phase shift values in the modified operational mode.

It is possible that alternating current output voltage of the secondary winding structure (which is generated upon reception of the electromagnetic field generated by the primary winding structure) is rectified, e.g. by a rectifier. The rectified output voltage can be supplied to the at least one energy storage element which can also be referred to as energy storage module. The rectified output voltage denotes the output voltage provided by the rectifier, wherein the rectifier is a vehicle-sided element. Moreover, the alternating output current of the secondary winding structure can also be rectified and supplied to the energy storage element. Depending on the design of the secondary winding structure, the secondary winding structure can provide a voltage source or a current source.

The energy storage element can be an electric element of an electric network of the vehicle, in particular a capacitive element. In particular, the energy storage element can be an element of a DC part of the vehicle-sided electric network.

The energy storage element can e.g. be a battery or an accumulator, in particular a traction battery of the vehicle. Alternatively or in addition, the energy storage element can be a capacitive element, in particular an intermediate circuit capacitor, of a vehicle-sided electric network, e.g. an intermediate circuit. The intermediate circuit can be a portion of a vehicle-sided traction network. The rectified voltage or the intermediate circuit voltage can e.g. be supplied to a vehicle-sided converter, wherein the vehicle-sided converter generates an AC voltage for operating a vehicle-sided electric machine and/or any other vehicle-sided appliance. Thus, the rectified output voltage can be used to transfer electric power to the vehicle-sided electric network, e.g. the battery, in particular the traction battery, of the vehicle in order to charge said battery. Alternatively or in addition, the rectified output voltage can be used to transfer electric power to the electric machine via the intermediate circuit capacitor in order to operate the electric machine. This can be referred to as dynamic energy transfer. It is, of course, possible that the traction battery is electrically connected to the intermediate circuit capacitor.

The rectified output voltage of the secondary winding structure can also be referred to as transfer voltage, rectified voltage or DC link voltage. The rectified output current of the secondary winding structure can also be referred to as transfer current or rectified current.

The rectified output voltage and/or output current can be adjusted by varying the phase shift value(s). It is, of course, possible that the rectified output voltage and/or rectified output current is additionally adjusted by adjusting other input variables, e.g. a field strength.

Preferably, the phase shift value(s) is/are adjusted in order to prepare an energy transfer process, in particular an energy transfer process from the primary side to the secondary-sided electric network. Preparing a transfer process can mean that the phase shift value(s) is/are adjusted before the beginning of a transfer process. The transfer process can denote a process of transferring energy to the aforementioned vehicle-sided electric network, e.g. battery, e.g. traction battery, and/or to the aforementioned capacitive element, e.g. the intermediate circuit capacitor. If the transfer process is used for charging an energy storage element, it can also be referred to as charging process. In this case, the transfer voltage can also be referred to as charging voltage and the transfer current can also be referred to as charging current.

Alternatively or in addition, the phase shift value(s) can be adjusted in order to initiate an energy transfer process. In this case, the phase shift value(s) can be adjusted such that the desired rectified output voltage is higher than the actual output voltage of the energy storage element. In this case, a transfer current is supplied to the energy storage element. A transfer current can denote a current which flows into the energy storage element.

Alternatively or in addition, the phase shift value(s) is/are adjusted in order to control the energy transfer process. In this case, the phase shift value(s) can be adjusted during the energy transfer process.

Generally, the phase shift value(s) can be adjusted such that at least one desired transfer parameter, e.g. a desired output power, output voltage and/or output current of the secondary winding structure, is provided. It is, for instance, possible to adjust the phase shift value(s) such that a desired output power, output current and/or output voltage is maintained or corresponds to a desired time course of the transfer parameter.

The phase shift value(s) can also be adjusted depending on charging characteristics of the at least one energy storage element. In particular, the phase shift value(s) can be adjusted depending on a state of charge (SOC) of the energy storage element. Depending on the SOC, an actual total storage element voltage, e.g. an open circuit voltage, of the energy storage element can be determined, wherein the desired rectified output voltage can be determined in order to prepare or to initiate or to control an energy transfer process, wherein the phase shift value(s) can be adjusted such that the desired rectified output voltage is provided.

Information on the actual charging characteristic, e.g. the SOC, and/or the transfer current can be determined and transmitted from the secondary side to the primary side, e.g. via at least one communication means. Based on the transmitted information, a primary-sided control unit can adjust the phase shift value(s), e.g. by controlling the WPC.

Further described is an embodiment, wherein a switching time within the control of the switching elements of the primary-sided inverter is varied, wherein a switching time of a switching element of a switching leg of the inverter is determined such that a desired pulse width is provided and a desired phase shift between the operating currents is provided and a current through a freewheeling diode which is connected parallel to the switching element is oriented in the conducting direction of the freewheeling diode. This embodiment can provide subject-matter for an independent invention. Thus, a method for inductively supplying power to a vehicle is described, wherein operating currents are supplied to the winding structures of a primary-sided arrangement, wherein a first operating current is supplied to the first winding structure, wherein a second operating current is supplied to the second winding structure and wherein a third operating current is supplied to the third winding structure. Further, the switching time within the control of the switching elements of the primary-sided inverter is varied, wherein a switching time of a switching element of a switching leg of the inverter is determined such that a desired pulse width is provided (first condition) and a desired phase shift between the operating currents is provided (second condition) and a current through a freewheeling diode which is connected parallel to the switching element is oriented in the conducting direction of the freewheeling diode (third condition).

The inverter which provides the operating currents for the winding structures can have three switching legs, wherein each switching leg can comprise two switching elements connected in series. A switching element can e.g. be an IGBT or a MOSFET. The three switching legs can be connected in parallel.

To each switching element, a freewheeling diode can be connected in parallel, wherein a conducting direction of the freewheeling diode is oriented reverse to the conducting direction of the switching element. Further, a capacitance can be connected in parallel to each switching element.

The inverter can be connected to the winding structures by a filter element. Thus, the primary-sided arrangement can comprise at least one, preferably three, filter elements. A filter element can e.g. be designed as a resonant circuit filter, wherein a resonant circuit filter can comprise at least one inductive element and at least one capacitive element. The filter element is designed such that undesired harmonics of the alternating voltage or alternating current output signal of the inverter are reduced. It is, for instance, possible that a section of the switching leg between the two switching elements is connected to a filter element, e.g. an inductive element of the filter element, wherein the filter element is connected to a feeding point of a winding structure.

Due to the capacitances, resistances and inductances in the electric network comprising the inverter and the filter elements, current oscillations can occur after a switching event, in particular if a switching element is switched off. Especially in case of a star connection of all filter elements, current oscillations in the filter elements which is connected to the switching leg comprising the switching element which has performed a switching action will result in current oscillations in at least one of the remaining filter elements. Now, the switching time of a switching element in a switching leg connected to one of the remaining filter elements should be chosen such that the stated conditions are fulfilled. This advantageously extends a time window of feasible switching time points. This again allows to flexibly adapt switching times in order to adjust an operating current, in particular an amplitude of the operating current. In other words, a switching time-based control of the operating current is described.

Corresponding to the explanations related to the variation of the phase shift value(s), the rectified output voltage and/or output current can be adjusted by varying the switching time within the control of the switching elements of the primary-sided inverter. It is, of course, possible that the rectified output voltage and/or rectified output current is additionally adjusted by adjusting other input variables, e.g. a field strength.

Preferably, the switching time(s) is/are adjusted in order to prepare an energy transfer process, in order to initiate an energy transfer or to control an energy transfer Generally, the switching time(s) can be adjusted such that at least one desired transfer parameter, e.g. a desired output power, output voltage and/or output current of the secondary winding structure, is provided. It is, for instance, possible to adjust the switching time(s) such that a desired output power, output current and/or output voltage is maintained or corresponds to a desired time course of the transfer parameter.

The switching time(s) can also be adjusted depending on charging characteristics of the at least one energy storage element. In particular, the switching time(s) can be adjusted depending on a state of charge (SOC) of the energy storage element. Depending on the SOC, an actual total storage element voltage, e.g. an open circuit voltage, of the energy storage element can be determined, wherein the desired rectified output voltage can be determined in order to prepare or to initiate or to control an energy transfer process, wherein the phase shift value(s) can be adjusted such that the desired rectified output voltage is provided.

BRIEF DESCRIPTION OF THE DRAWINGS

The invention will be described with reference to exemplary embodiments of the invention which are illustrated by the following figures. The figures show.

DESCRIPTION OF THE INVENTION

In the following, the same numerals denote elements with the same or similar technical features.

Figure 1:
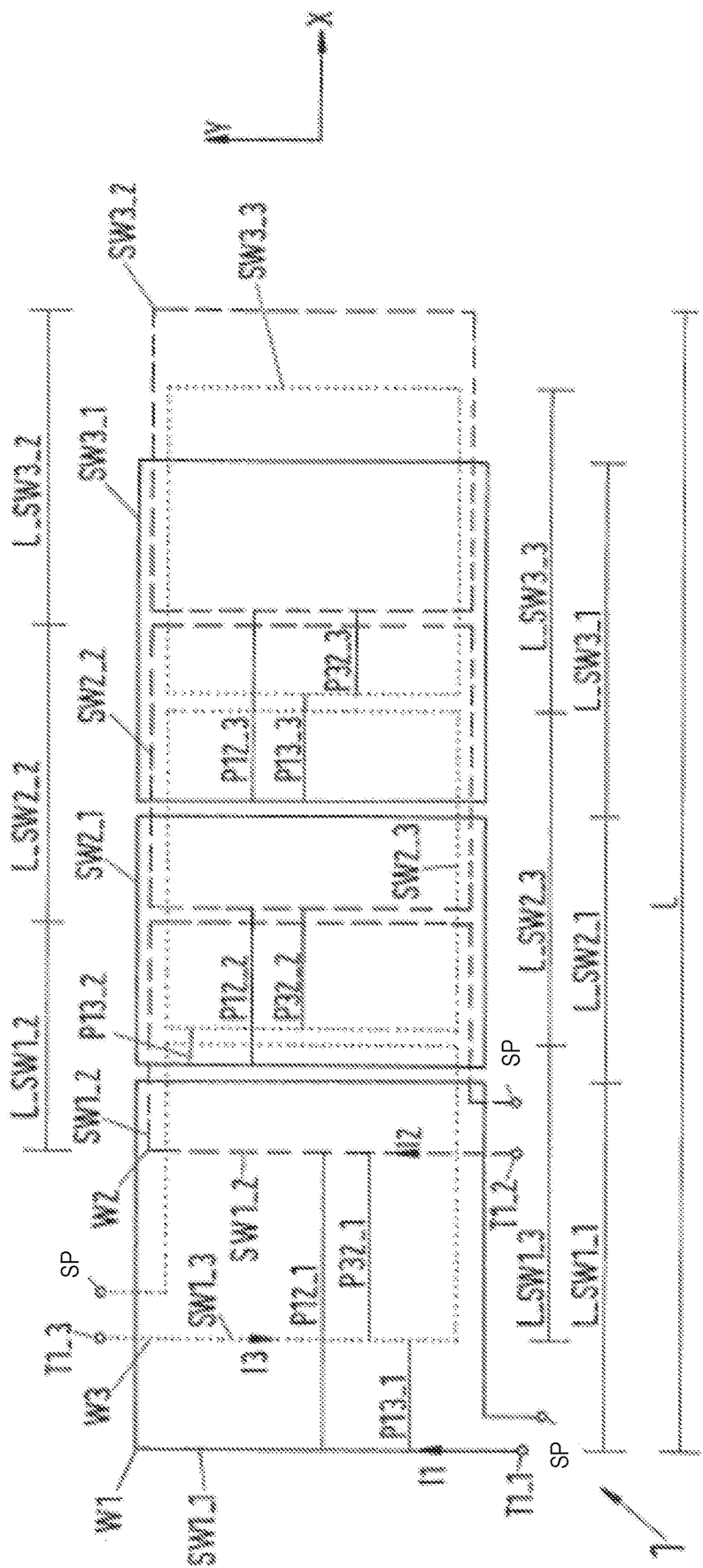
FIG. 1: a schematic top view on a primary-sided arrangement of primary winding structures, FIG. 2 a schematic perspective view on a primary-sided arrangement of primary winding structures according to another embodiment of the invention.
Figure 4:
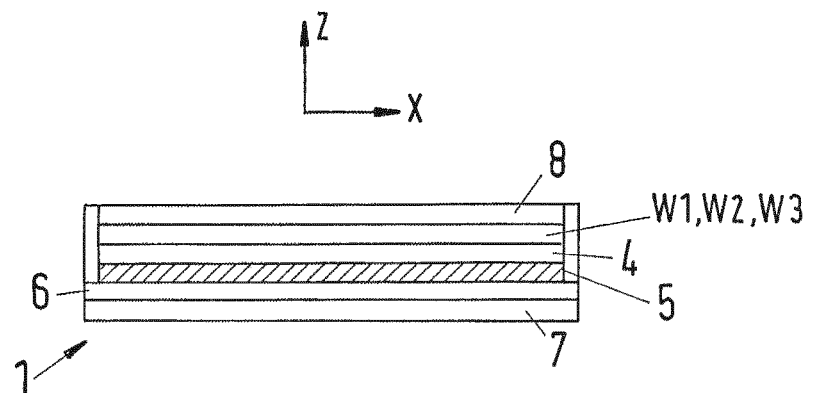
FIG. 4: a schematic cross section of a primary-sided arrangement according to another embodiment of the invention.

FIG. 1 shows a schematic top view on a primary-sided arrangement 1 of primary winding structures W1, W2, W3 of a system 2 for inductive power transfer (see FIG. 4). The primary-sided arrangement 1 comprises a first winding structure W1 with three subwinding structure $SW1\_1$, $SW2\_1$, $SW3\_1$. Further, the primary-sided arrangement 1 comprises a second winding structure W2 and a third winding structure W3 which also have three subwinding structures $SW1\_2$, $SW2\_2$, $SW3\_2$, $SW1\_3$, $SW2\_3$, $SW3\_3$, respectively. These winding structures W1, W2, W3 provide each a phase line of a three phase topology. In the example shown in FIG. 1, the subwindings $SW1\_1, \ldots, SW3\_3$ have the shape of a rectangular loop.

Further shown is a primary-sided coordinate system with a primary-sided longitudinal axis x and a primary-sided lateral axis y. Directions of these axes x, y are indicated by arrows. These axes x, y span a plane, wherein the winding structures W1, W2, W3 are substantially arranged in planes parallel to said plane. A primary-sided vertical axis z (see FIG. 3) is oriented perpendicular to said plane. It is possible that the winding structures W1, W2, W3 are arranged in different planes in order to overlap each other.

The winding structures W1, W2, W3 extend along the longitudinal axis x. The lengths $L\_SW1\_1$, $L\_SW2\_1$, $L\_SW3\_1$, $L\_SW1\_2$, $L\_SW2\_2$, $L\_SW3\_2$, $L\_SW1\_3$, $L\_SW2\_3$, $L\_SW3\_3$ of each subwinding $SW1\_1, \ldots, SW1\_3$ vary along the longitudinal axis. It can e.g. be seen that the length $L\_SW1\_1$ of the first subwinding structure $SW1\_1$ of the first winding structure W1 is higher than the length $L\_SW2\_1$ of the second subwinding structure $SW2\_1$ of the first winding structure W2. Also, the length $L\_SW1\_1$ of the first subwinding structure $SW1\_1$ of the first winding structure W1 is higher than the length $L\_SW1\_2$ of the first subwinding structure $SW1\_2$ of the second winding structure W2 and higher than the length $L\_SW1\_3$ of the first subwinding structure $SW1\_3$ of the third winding structure W3.

The lengths $L\_SW1\_1, \ldots, L\_SW3\_3$ are measured along the longitudinal axis x. That the winding structures W1, W2, W3 extend along the longitudinal axis x can mean that geometrical centres of each subwinding $SW1\_1, \ldots, SW1\_3$ are arranged along a straight line parallel to the longitudinal axis x.

Each subwinding $SW1\_1, \ldots, SW1\_3$ comprises sections which extend along the longitudinal axis x and sections which extend along the lateral direction y. The lengths $L\_SW1\_1, \ldots, L\_SW3\_3$ can denote the distance between two successive sections of a subwinding $SW1\_1, \ldots, SW1\_3$ which extend parallel to the lateral axis y.

Further shown is are pitches $P12\_1$, $P12\_2$, $P12\_3$ between corresponding subwinding structures $SW1\_1$, $SW1\_2$, $SW2\_1$, $SW2\_2$, $SW3\_1$, $SW3\_2$ of the first and the second winding structure W1, W2. The pitches $P12\_1$, $P12\_2$, $P12\_3$ are shown as the distance along the longitudinal axis x of corresponding lateral sections of the respective subwinding structures $SW1\_1$, $SW1\_2$, $SW2\_1$, $SW2\_2$, $SW3\_1$, $SW3\_2$. The pitches $P12\_1$, $P12\_2$, $P12\_3$, however, can also denote a distance between the geometrical centres of the subwinding structures SW1_1, SW1_2, SW2_1, SW2_2, SW3_1, SW3_2 along the longitudinal axis x.

Correspondingly, pitches P13_1, P13_2, P13_3 between corresponding subwinding structures SW1_1, SW1_3, SW2_1, SW2_3, SW3_1, SW3_3 of the first and the third winding structure W1, W3 and pitches P32_1, P32_2, P32_3 between corresponding subwinding structures SW1_3, SW1_2, SW2_3, SW2_2, SW3_3, SW3_2 of the third and the second winding structure W3, W2 are shown.

The pitches P12_1, P12_2, P12_3 between corresponding subwinding structures SW1_1, SW1_2, SW2_1, SW2_2, SW3_1, SW3_2 of the first and the second winding structure W1, W2 vary along the longitudinal axis x. For instance, a pitch P12_1 between the first subwinding structures SW1_1, SW1_2 is higher than the pitch P12_2 between the second subwinding structures SW1_1, SW1_2. Also, pitches P13_1, P13_2, P13_3 between corresponding subwinding structures SW1_1, SW1_3, SW2_1, SW2_3, SW3_1, SW3_3 of the first and the third winding structure W1, W3 and pitches P32_1, P32_2, P32_3 between corresponding subwinding structures SW1_3, SW1_2, SW2_3, SW2_2, SW3_3, SW3_2 of the third and the second winding structure W3, W2 vary along the longitudinal axis x.

Further shown is a total length L of the primary-sided arrangement, wherein the lengths L_SW1_1, ..., L_SW3_3 and the pitches P12_1, ..., P32_3 are chosen such that the desired total length L is provided.

The pitches P13_1, P13_2, P13_3 between corresponding subwinding structures SW1_1, SW1_3, SW2_1, SW2_3, SW3_1, SW3_3 of the first winding structure W1 and the third winding structure W3 are smaller than the corresponding pitches P12_1, P12_2, P12_3 between corresponding subwinding structures SW1_1, SW1_2, SW2_1, SW2_2, SW3_1, SW3_2 of the first and the second winding structure W1, W2, respectively. Further shown are feeding points T1_1, T1_2, T1_3 of the winding structures W1, W2, W3 which allow supplying an operating current I1, I2, I3 to each winding structure W1, W2, W3. In a regular operation of the winding structures W1, W2, W3 in order to generate an electromagnetic field for inductive power transfer, a first operating current I1 is supplied to the first winding structure W1, wherein a second operating current I2 is supplied to the second winding structure W2, wherein a third operating current I3 is provided to the third winding structure W3. In FIG. 1, arrows indicate the flow direction of a positive current I1, I2, I3. A flow direction of positive currents I1, I2, I3 is directed from the respective feeding point T1_1, T1_2, T1_3 to a common star point SP.

As seen in FIG. 1, the magnetic flux generated by the first subwinding structure SW1_1, SW1_2 of the first and the second winding structure W1, W2 will be oriented against a vertical direction z (see FIG. 3), wherein the magnetic flux generated by the first subwinding structure SW1_3 of the third winding structure W3 will be oriented in the vertical direction z. Further shown is that the feeding points T1_1, T1_2 of the first subwinding structure SW1_1, SW1_2 of the first and second winding structure W1, W2 and the feeding point T1_3 of the first subwinding structure SW1_3 of the third winding structure W3 are arranged on opposite sides of the primary-sided arrangement 1 of primary winding structures W1, W2, W3 to with respect to the lateral direction of the lateral axis y.

A phase shift between the first and the second operating current I1, I2 can be equal to 120°, wherein a phase shift between the first and the third operating current I1, I3 can be equal to 240°.

Figure 2:
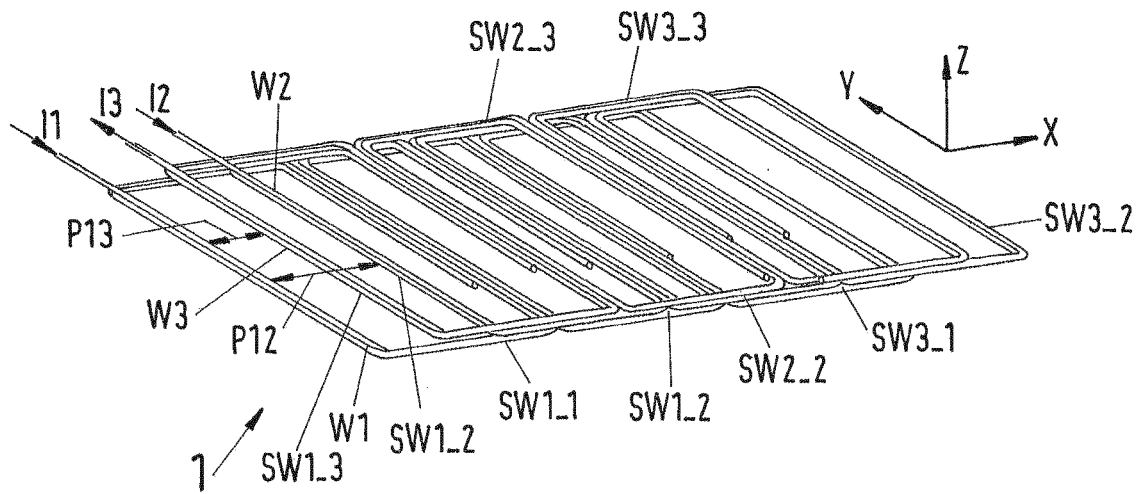
Figure 3:
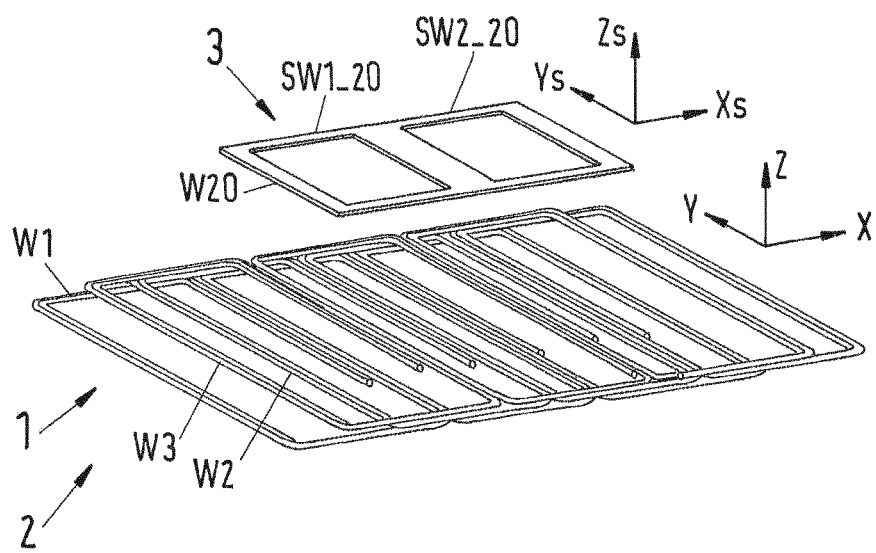
FIG. 3: the primary-sided arrangement of FIG. 3 and a secondary-sided arrangement of winding structures.

FIG. 2 shows a schematic perspective view on a primary-sided arrangement 1 of primary winding structures W1, W2, W3. It is shown that each winding structure W1, W2, W3 comprises three subwinding structures SW1_1, SW2_1, SW3_1, SW1_2, SW2_2, SW2_3, SW1_3, SW2_3, SW3_3 which all extend along the longitudinal axis x. For illustrative purposes, reference numerals for the lengths of the subwinding structures SW1_1, ... SW3_3 and for the pitches have been omitted. Subwinding structures SW1_1, ..., SW3_3 of one winding structure W1, W2, W3 are arranged adjacent to each other along the longitudinal axis x and do not overlap. FIG. 3, however, shows that the winding structures W1, W2, W3 are arranged in different planes which are oriented parallel to each other but arranged at different vertical positions along the vertical axis z. Further shown are the operating currents I1, I2, I3 of each winding structure W1, W2, W3. This has been explained previously.

FIG. 3 shows a perspective view on a system for inductive power transfer 2, wherein the system comprises a primary-sided arrangement 1 with primary winding structures W1, W2, W3 as shown in FIG. 3. The system further comprises a secondary-sided arrangement 3 of one secondary-sided winding structure W20. The secondary winding structure W20 comprises two adjacent subwinding structures SW1_20, SW2_20 which are arranged adjacent to each other along a secondary-sided longitudinal axis xs. Further, the secondary winding structure W20 is substantially arranged in a plane spanned by the secondary-sided longitudinal axis xs and a secondary-sided lateral axis ys which is oriented perpendicular to the secondary-sided longitudinal axis xs. Both secondary-sided axes xs, ys are oriented perpendicular to a secondary-sided vertical axis zs. The secondary-sided arrangement 3 can be part of a receiving unit attached to a vehicle, in particular an automobile. In this case, the secondary-sided longitudinal axis xs can be oriented parallel to a roll axis of the vehicle, the secondary-sided lateral axis ys can be oriented parallel to a pitch axis of the vehicle and the secondary-sided vertical axis zs can be oriented parallel to a yaw axis of the vehicle.

In an aligned state of the primary-sided arrangement 1 and the secondary-sided arrangement 3, corresponding axes x, xs; y, ys; z, zs are oriented parallel to each other. Further, a geometric centre of the secondary winding structure W20 can be arranged above an active area enclosed by the winding structures W1, W2, W3 of the primary-sided arrangement 1 or a predetermined subarea of said active area or a predetermined area comprising said active area.

The subwindings SW1_20, SW2_20 of the secondary winding structure W20 are also shaped as rectangular loops.

FIG. 4 shows a schematic cross section of a primary-sided arrangement 1. Schematically indicated are the winding structures W1, W2, W3 of the primary-sided arrangement 1. These winding structures W1, W2, W3 are arranged in a cable bearing element 4 which is adapted to position and/or to hold the winding sections of the winding structures W1, W2, W3 shown e.g. in FIG. 2.

Further shown are ferrite elements 5 of a ferrite arrangement which is arranged under the winding structures W1, W2, W3 with respect to the primary-sided vertical axis z.

Further shown is an insulating layer 6 and a magnetic shielding layer 7 which can e.g. be designed as an aluminium plate. Further shown is a cover element 8 which covers the cable bearing element 4 with the winding structures W1, W2, W3. The insulating layer 6 and the magnetic shielding layer 7 are arranged under the ferrite elements 5.

Figure 5:
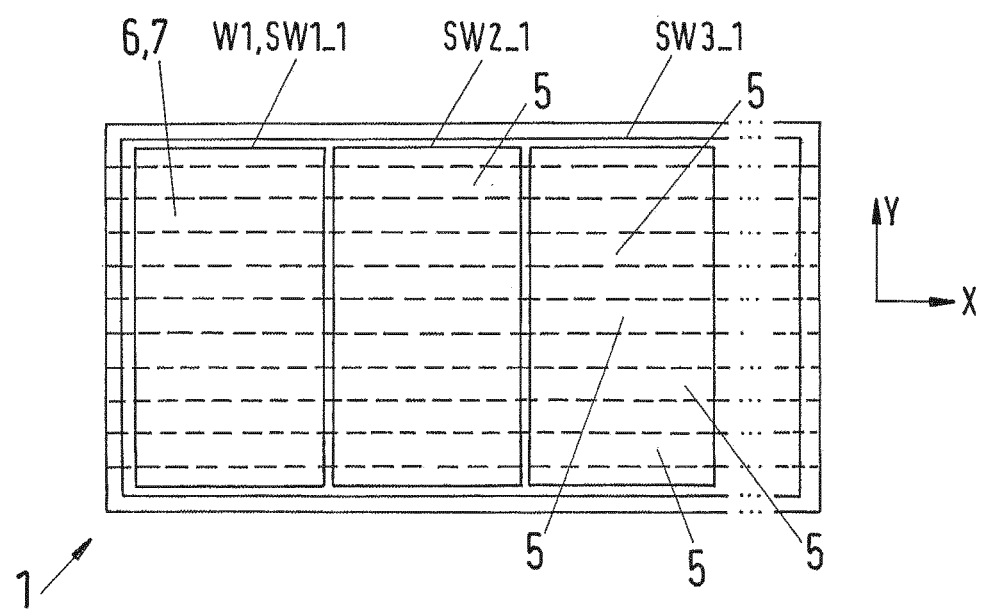
FIG. 5: a schematic top view on the primary-sided arrangement shown in FIG. 5, FIG. 6: a schematic perspective view on a secondary-sided arrangement of winding structures.

FIG. 5 shows a schematic top view on the primary-sided arrangement 1 shown in FIG. 5. Shown is the first winding structure W1 with its subwinding structures SW1_1, SW2_1, SW3_1. Not shown are the second and third winding structure W2, W3. Further shown are the insulating layer 6 and the magnetic shielding layer 7.

Further shown is an arrangement of multiple ferrite elements 5, wherein the arrangement comprises multiple rows of at least one ferrite element 5. The ferrite elements 5 are e.g. designed as a ferrite bar or an arrangement of multiple ferrite bars which extend along the longitudinal axis x. Different rows are arranged along the lateral axis y with a non-zero gap between two adjacent rows along the lateral axis y.

Figure 6:
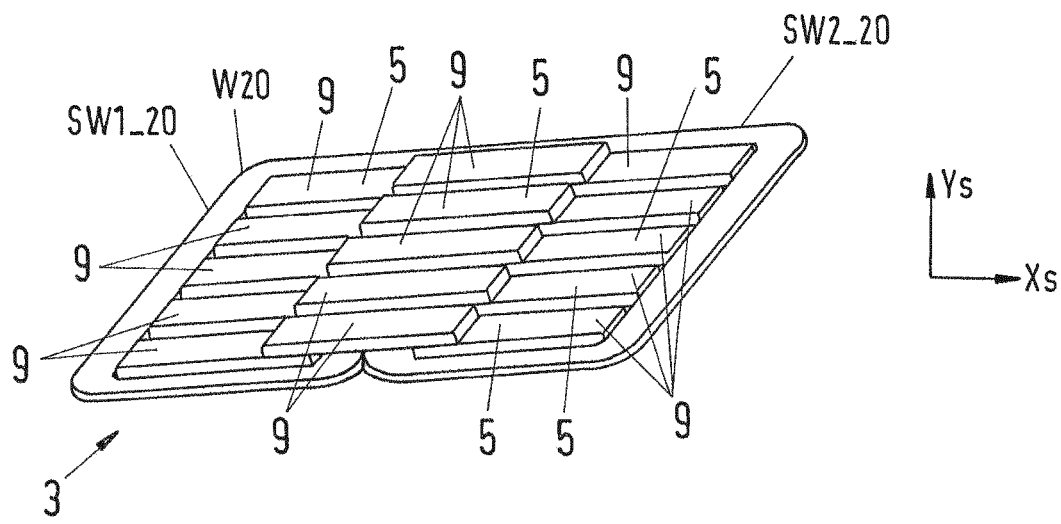

FIG. 6 shows a schematic perspective view on a secondary-sided arrangement 3 with the secondary winding structure W20 shown in FIG. 4. The secondary-sided arrangement 3 also comprises ferrite elements 5 of a ferrite arrangement which is provided by multiple rows of ferrite elements. One row of ferrite elements can comprise multiple ferrite bars 9. It is shown that the secondary-sided arrangement 3 and the primary-sided arrangement 1 shown in FIG. 6 have the same distance between adjacent rows of ferrite elements 5. It is further possible that the primary-sided arrangement 1 and the secondary-sided arrangement 3 have the same number of rows and/or the same number of ferrite elements within one row.

Further, the distance between two adjacent rows of primary-sided ferrite bars 9 or ferrite elements 5 of along the lateral axes y can be equal to the distance between two adjacent rows of primary-sided ferrite bars 9 or ferrite elements 5 of along the lateral axes ys.

In particular, if the primary-sided arrangement 1 and the secondary-sided arrangement 3 are arranged in the previously explained aligned state, the ferrite arrangements 5 of the secondary-sided arrangement 3 are located opposite to the ferrite arrangements 5 of the primary-sided arrangement 1 with respect to the vertical axes z, zs.

FIG. 6 shows that the each ferrite element 5 and thus the ferrite arrangement provides a recess to receive a section of the secondary-sided winding structure W20, in particular adjacent sections of the subwinding structures SW1_20, SW2_20 which extend along the secondary-sided lateral axis ys. A rear end section of one ferrite element 5, in particular a first ferrite bar 9, extends into an inner volume of the first subwinding structure SW1_20, wherein the inner volume denotes the volume enclosed by the rectangular loop providing the first subwinding structure SW1_20. A front end section of the ferrite element 5, in particular a third ferrite bar 9 of said ferrite element 5, extends into the inner volume of the second subwinding structure SW2_20. End sections of a centre section of a ferrite element, in particular a second ferrite bar 9 of said ferrite element 5, overlap the first and the third ferrite bar 9, respectively.

Figure 7:
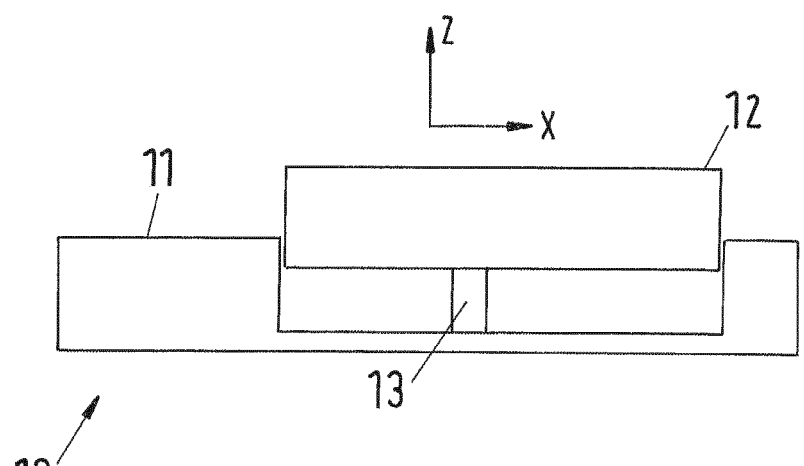
FIG. 7: a schematic side view of a primary unit.

FIG. 7 shows a schematic side view of a primary unit 10 which comprises a stationary part 11 and a movable part 12. The primary-sided arrangement 1 can be arranged on or within the movable part 12. The movable part 12 can be moved along the vertical axis z by a positioning means 13. In particular, the movable part 12 can be moved from a retracted state into an extended state and vice versa.

The invention claimed is:

1. A primary-sided arrangement of primary winding structures of a system for inductive power transfer, comprising: at least three phase lines; and
at least one winding structure per phase line;
wherein each winding structure comprises at least one subwinding structure;
wherein the winding structures extend along a longitudinal axis of the primary-sided arrangement;
wherein:
a pitch between corresponding subwinding structures of the winding structures varies along the longitudinal axis;
a length of subwinding structures of the winding structures varies along the longitudinal axis; or
a pitch between corresponding subwinding structures of the winding structures varies along the longitudinal axis and a length of subwinding structures of the winding structures varies along the longitudinal axis.

2. The primary-sided arrangement of claim 1, wherein a pitch between corresponding subwinding structures of the first winding structure and the third winding structure is smaller than a pitch between corresponding subwinding structures of the first winding structure and the second winding structure.

3. The primary-sided arrangement of claim 1, wherein a length of the subwinding structures of the winding structures along the longitudinal axis varies in the range of 5/10 to 15/10 of a standardized length.

4. The primary-sided arrangement of claim 1, wherein directions of the magnetic fluxes generated by corresponding subwinding structures of the first and second winding structure are equal, wherein said directions are oriented opposite to the direction of the magnetic flux generated by the corresponding subwinding structure of the third winding structure if either a positive or negative operating current flows through the corresponding subwinding structures.

5. The primary-sided arrangement of claim 1, wherein at least one feeding point of the first subwinding structure of the first winding structure and at least one feeding point of the first subwinding structure of the second winding structure are arranged on a first lateral side of the arrangement, wherein at least one feeding point of the first subwinding structure of the third winding structure is arranged on a second lateral side of the arrangement.

6. A system for inductive power transfer, wherein the system comprises a primary-sided arrangement of primary winding structures according to claim 1 and a secondary-sided arrangement of at least one secondary winding structure, wherein the secondary-sided arrangement comprises at least one phase line and one secondary winding structure per phase line.

7. A method for inductively supplying power to a vehicle, comprising:
supplying operating currents to the winding structures of a primary-sided arrangement according to claim 1, wherein a first operating current is supplied to the first winding structure, wherein a second operating current is supplied to the second winding structure, wherein a third operating current is supplied to the third winding structure.

8. The method according to claim 7, further comprising:
wherein in a standard operational mode the first operating current, controlling the second operating current and the third operating current such that a predetermined phase shift between all three operating currents is provided.

9. The method according to claim 7, further comprising:
wherein in a modified operational mode the first operating current, controlling the second operating current and the third operating current such that a set of phase shift values comprises at most two non-zero values and all non-zero phase shift values are equal.

10. The method according to claim 9, further comprising: reducing one of the operating currents to zero.

11. The method according to claim 10, further comprising:

controlling the remaining operating currents such that the non-zero phase shift value is 180° phase angle.

12. A method of manufacturing a primary-sided arrangement of primary winding structures, wherein the primary-sided arrangement of primary winding structures comprises at least three phase lines, the method comprising:

providing at least one winding structure per phase line, wherein each winding structure comprises at least one subwinding structure; and arranging the winding structures such that the subwinding structures extend along a longitudinal axis of the primary-sided arrangement;

wherein:

a pitch between corresponding subwinding structures of the winding structures varies along the longitudinal axis;

a length of subwinding structures of the winding structures varies along the longitudinal axis; or a pitch between corresponding subwinding structures of the winding structures varies along the longitudinal axis and a length of subwinding structures of the winding structures varies along the longitudinal axis.

13. The method of claim 12, wherein the pitch is varied such that a variation of a secondary-sided output voltage provided by a predetermined secondary winding structure in different positions or orientations relative to the primary-sided arrangement is minimized.

14. The method of claim 12, wherein the length is varied such that a variation of a secondary-sided output voltage provided by a predetermined secondary winding structure in different positions or orientations relative to the primary-sided arrangement is minimized.

15. The method of claim 12, wherein the length and the pitch are varied such that a variation of a secondary-sided output voltage provided by a predetermined secondary winding structure in different positions or orientations relative to the primary-sided arrangement is minimized.

* * * * *